United States Patent
Karnalkar et al.

(10) Patent No.: US 7,810,117 B2
(45) Date of Patent: Oct. 5, 2010

(54) SYSTEM AND METHOD OF ORGANIZING VIDEO CONTENT

(75) Inventors: Anup Karnalkar, Allen, TX (US); Jyotindra N. Shah, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 524 days.

(21) Appl. No.: 11/880,870

(22) Filed: Jul. 23, 2007

(65) Prior Publication Data

US 2009/0031385 A1  Jan. 29, 2009

(51) Int. Cl.
*G06F 3/00* (2006.01)
*G06F 12/00* (2006.01)
*G06F 13/00* (2006.01)
*G06F 17/00* (2006.01)
*H04N 5/445* (2006.01)

(52) U.S. Cl. .................. 725/39; 725/40; 725/47; 725/50; 725/51; 715/716; 707/821

(58) Field of Classification Search .................. 725/39, 725/47, 50, 51, 37, 38; 715/716; 707/821
See application file for complete search history.

(56) References Cited

U.S. PATENT DOCUMENTS

| 6,230,168 | B1* | 5/2001 | Unger et al. ................. 715/206 |
| 6,732,367 | B1 | 5/2004 | Ellis et al. |
| 2001/0053274 | A1* | 12/2001 | Roelofs et al. ................. 386/46 |
| 2003/0007782 | A1 | 1/2003 | Kamen |
| 2004/0162845 | A1 | 8/2004 | Kim et al. |

* cited by examiner

*Primary Examiner*—Dominic D Saltarelli
(74) *Attorney, Agent, or Firm*—Toler Law Group

(57) ABSTRACT

A method of organizing video content includes receiving video content title amendment data at a video content organizing server from a set-top box device. The video content title amendment data indicates that a first title of the video content has been changed to a second title of the video content. The method also includes receiving a request at the video content organizing server from a remote device to access data relating to the video content. Further, the method includes sending video content second title data to the remote device in response to receiving the request. The video content second title data indicates the second title of the video content.

29 Claims, 7 Drawing Sheets

SYSTEM AND METHOD OF ORGANIZING VIDEO CONTENT

FIELD OF THE DISCLOSURE

The present disclosure is generally related to systems and methods of organizing video content.

BACKGROUND

Television viewing is a part of daily life for many people. Some television viewers record video content at a data storage device, such as a digital video recorder (DVR). Recorded video content may be organized into one or more directories based on titles assigned by a video content provider. However, the titles assigned to video content by a video content provider may not be conducive to effectively organizing recorded video content for a particular viewer. Hence, there is a need for an improved system and method of organizing video content.

DETAILED DESCRIPTION OF THE DRAWINGS

Figure 1:
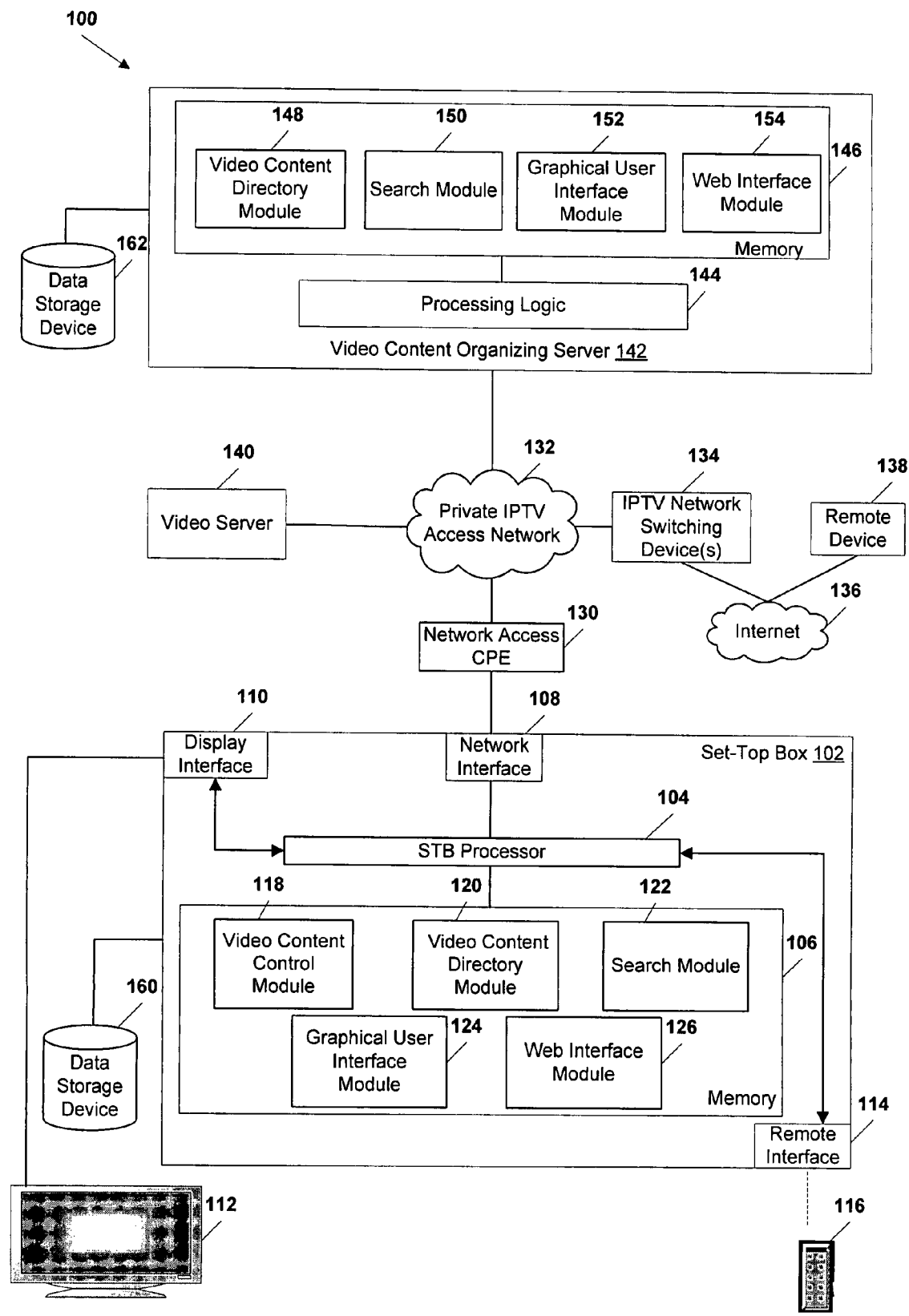
FIG. 1 is a block diagram of a particular embodiment of a system to organize video content.

A system to organize video content is disclosed that includes processing logic and memory accessible to the processing logic. The memory includes a video content directory module executable by the processing logic to receive a command from a remote device to amend a first title of video content to a second title. The video content directory module is also executable by the processing logic to send video content title amendment data to the set-top box device. The video content title amendment data indicates that the first title of the video content has been changed to the second title.

In another embodiment, a set-top box device includes a processor and memory accessible to the processor. The memory includes instructions executable by the processor to send video content first title data to a video content organizing server. The video content first title data indicates a first title of a video content selection of a plurality of video content selections. The plurality of video content selections are stored at a data storage device associated with the set-top box device. The memory also includes instructions executable by the processor to receive a command to amend the first title of the video content selection to a second title. Further, the memory includes instructions executable by the processor to send video content title amendment data to the video content organizing server. The video content title amendment data indicates that the first title of the video content selection has been changed to the second title.

In another embodiment, a method of organizing video content is disclosed that includes receiving video content title amendment data at a video content organizing server from a set-top box device. The video content title amendment data indicates that a first title of the video content has been changed to a second title. The method also includes receiving a request at the video content organizing server from a remote device to access data relating to the video content. Further, the method includes sending video content second title data to the remote device in response to receiving the request. The video content second title data indicates the second title of the video content.

In another embodiment, a method of organizing video content is disclosed that includes amending a first title of video content to a user-defined title in response to receiving a command to amend the first title of the video content to the user-defined title. The video content is stored at a data storage device associated with a set-top box device. The method also includes automatically assigning the video content to at least one of a plurality of directories based on the user-defined title. Each of the plurality of directories is associated with a respective category.

In another embodiment, a computer-readable medium is disclosed that has instructions to cause a processor to execute a method that includes receiving video content title amendment data at a video content organizing server from a set-top box device. The video content title amendment data indicates that a first title of the video content has been changed to a second title. The computer-readable medium also includes instructions to cause the processor to execute a method that includes receiving a request at the video content organizing server from a remote device to access data relating to the video content and sending video content second title data to the remote device in response to receiving the request. The video content second title data indicates the second title of the video content.

FIG. 1 is a block diagram illustrating a particular embodiment of a system 100 to organize video content. The system 100 includes a set-top box (STB) device 102 that communicates with a server, such as a video content organizing server 142, via a network, such as a private Internet Protocol Television (IPTV) access network 132. The set-top box device 102 and the video content organizing server 142 may communicate with a video server 140, one or more IPTV network switching devices 134, or any combination thereof via the private IPTV access network 132. The set-top box device 102 and the video content organizing server 142 may communicate with a remote device 138 via one or more IPTV network switching devices 134 and the Internet 136. In an illustrative, non-limiting embodiment, the remote device may include a mobile telephone, a laptop computer, a desktop computer, a hand-held computing device, or any combination thereof.

The set-top box device 102 includes a STB processor 104 and a memory 106 that is accessible to the STB processor 104. The STB processor 104 can facilitate the communication of video content to a display device 112 via a display interface 110. In addition, the STB processor 104 may communicate with a remote control device 116 via a remote interface 114. The set-top box device 102 may also communicate with a data storage device 160. For example, the data storage device 160 may be coupled to the set-top box device 102. In another example, the data storage device 160 may be integrated with the set-top box device 102. In an illustrative, non-limiting embodiment, the data storage device 160 may include a digital video recorder (DVR).

In a particular embodiment, the STB processor 104 may communicate with the private IPTV access network 132 via a network interface 108. In an illustrative, non-limiting embodiment, customer premises equipment (CPE) 130 may facilitate communication between the network interface 108 and the private IPTV access network 132. The CPE 130 may include a router, a local area network device, a modem, such as a digital subscriber line (DSL) modem, a Cable Television system modem, a residential gateway, any other suitable device for facilitating communication between the network interface 108 of the set-top box device 102 and the private IPTV access network 132, or any combination thereof.

In a particular embodiment, the memory 106 includes a video content control module 118 that is executable by the STB processor 104 to receive an input indicating a request to receive video content. In an illustrative embodiment, a video content selection input may be received from an input device associated with the set-top box device 102, such as the remote control device 116. The video content control module 118 may be executable by the STB processor 104 to send data corresponding to a request for video content to a network device associated with a video content provider network. In an illustrative embodiment, the video content control module 118 may be executable by the STB processor 104 to send data corresponding to a request for video content to a server of the video content provider network, such as the video server 140.

In a particular embodiment, the video content control module 118 may be executable by the STB processor 104 to receive requested video content from the video server 140. The video content control module 118 may also be executable by the STB processor 104 to store received video content at a data storage device, such as the data storage device 160. The video content stored at the data storage device 160 may include a plurality of video content selections. Further, the video content control module 118 may be executable by the STB processor 104 to provide received video content to the display device 112 via the display interface 110.

In a particular embodiment, the video content control module 118 may be executable by the STB processor 104 to assign a unique identifier to a video content selection stored at the data storage device 160, such that data associated with a particular stored video content selection is accessed according to the unique identifier. The data associated with a stored video content selection may include video data; audio data; video content title data; video content summary data, such as plot, actors, rating, or release date; a time that the video content selection was broadcast; a time that the video content selection was recorded; a video content category indicator; or any combination thereof.

In a particular embodiment, the memory 106 may include a video content directory module 120 that is executable by the STB processor 104 to organize video content stored at the data storage device 160 into at least one directory. In an illustrative embodiment, the video content directory module 120 may be executable by the STB processor 104 to assign video content stored at the data storage device 160 to a main directory, a plurality of sub-directories, or any combination thereof. For example, the video content directory module 120 may be executable by the STB processor 104 to associate the unique identifier of a particular video content selection with a directory that includes the particular video content selection. To illustrate, each directory may be allocated a number of memory locations at the data storage device 160 and the memory locations related to a respective directory may include the unique identifier of each video content selection assigned to the respective directory. In an illustrative, non-limiting embodiment, the video content directory module 120 may be executable by the STB processor 104 to receive a request for information related to a directory, such as information used to generate a graphical user interface that includes the title of each video content selection included in the directory. In response to receiving the request, the video content directory module 120 may be executable by the STB processor 104 to retrieve data associated with the unique identifiers of the particular video content selections included in the directory, such as video content title data, from the data storage device 160.

Each video content selection stored at the data storage device 160 may be associated with the main directory, at least one sub-directory, or any combination thereof. In an illustrative, non-limiting embodiment, the main directory may include all of the stored video content selections. A sub-directory may include at least one stored video content selection, or a sub-directory may not include any stored video content selections at a particular time.

In an illustrative embodiment, categories associated with the sub-directories may be provided by a video content provider, a subscriber associated with the set-top box device 102, or any combination thereof. The categories for the sub-directories may include sports, news, movies, comedy, drama, action adventure, science fiction, music, classics, reality shows, talk shows, or any combination thereof. The categories of the sub-directories may also be related to a time that video content was stored at the data storage device 160, such as "new" or "old," or related to particular subscribers associated with the set-top box device 102, such as "Dad," "Mom," or "John." In an illustrative, non-limiting embodiment, a video content selection stored at the data storage device 160 may be associated with at least one video content category indicator specifying the categories that relate to the respective video content selection.

In an illustrative embodiment, the video content directory module 120 may be executable by the STB processor 104 to automatically assign video content stored at the data storage device 160 to a particular sub-directory. For example, video content may be assigned to the particular sub-directory based on a title of the video content, a video content category indicator of the video content, a time that the video content was broadcast, a time that the video content was recorded, summary information associated with the video content, or any combination thereof. To illustrate, video content selections recorded at the data storage device 160 within two weeks of a current date may be assigned to a "new" sub-directory and all other video content selections may be assigned to an "old" sub-directory. In another example, the video content directory module 120 may be executable by the STB processor 104 to assign stored video content according to a profile associated with a particular subscriber of the set-top box device 102. To illustrate, a profile for a subscriber "John" may indicate that John's favorite television show is "Myth Busters." Accordingly, the video content directory module 120 may be executable by the STB processor 104 to automatically assign stored video content having the title "Myth Busters" to a "John" sub-directory.

Additionally, the video content directory module 120 may be executable by the STB processor 104 to receive commands from an input device to assign video content stored at the data storage device 160 to sub-directories. For example, the set-top box device 102 may receive inputs entered via the remote control device 116 to assign a particular video content selection to a comedy sub-directory.

In a particular embodiment, the video content directory module 120 is executable by the STB processor 104 to receive a command to amend a first title of video content stored at the data storage device 160 to a second title. The first title may be a title that was assigned to the video content when the video content was originally recorded at the data storage device 160, a title that was provided by the video content provider, or a current title of the video content. The second title may include a user-defined title.

The video content directory module 120 may be executable by the STB processor 104 to store data indicating a first title of video content, a second title of video content, any subsequent titles of video content, or any combination thereof at the data storage device 160. Each title associated with a particular video content selection may be accessed according to the unique identifier associated with the particular video content selection.

In an illustrative embodiment, the video content directory module 120 may be accessible by the STB processor 104 to receive at least one command from an input device, such as the remote control device 116, to amend the first title of the video content to the second title. In response to receiving at least one command to amend the first title of the video content, the video content directory module 120 may be executable by the STB processor 104 to modify data stored at the data storage device 160 that is associated with the video content. For example, data associated with the unique identifier of the video content indicating a first title of the video content may be overwritten to indicate a second title. In another example, data indicating the second title of the video content may be added to the data stored at the data storage device 160 that is associated with the video content. In an illustrative, non-limiting embodiment, the video content directory module 120 may be executable by the STB processor 104 to store an indicator with the video content data specifying that data indicating the second title of the video content is to be provided in response to a request for title information related to the video content rather than data indicating the first title. To illustrate, data indicating the second title of the video content may be provided in response to receiving a request for title information related to the video content, such as for a graphical user interface related to a directory that includes the video content, unless the request specifically includes instructions to retrieve previous title data of the video content.

The first title of the video content may be amended to a second title by a subscriber associated with the set-top box device 102 for a particular purpose. For example, the second title may help the subscriber to more readily identify the subject matter of the video content than the first title. To illustrate, the first title of video content may be "The Tonight Show," and the second title may be "The Tonight Show: Interviews with Kelly Clarkson and Brad Pitt."

In an illustrative embodiment, the video content directory module 120 may be executable by the STB processor 104 to automatically assign video content to a plurality of sub-directories according to the first title, the second title, or any combination thereof. In an illustrative, non-limiting embodiment, the video content directory module 120 may be executable by the STB processor 104 to access a comprehensive database that categorizes well-known people, places, movies, television programs, events, or any combination thereof, and to assign a particular video content selection to a sub-directory based on a comparison of words in a title of the particular video content selection and words in the database. For example, the database may indicate that Kelly Clarkson is a singer, that Brad Pitt is a movie actor, and that "The Tonight Show" is a talk show. Therefore, a video content selection with the title, "The Tonight Show: Interviews with Kelly Clarkson and Brad Pitt," may be assigned to a "music" sub-directory based on the interview with Kelly Clarkson and a "movie" sub-directory based on the interview with Brad Pitt.

In addition, the video content directory module 120 may be executable by the STB processor 104 to identify that video content with the title "The Tonight Show," should be assigned to a "talk show" directory. In an illustrative, non-limiting embodiment, the video content directory module 120 may also be executable by the STB processor 104 to assign video content having the title "The Tonight Show" to a "talk show" directory based on a video content category indicator assigned by the video content provider specifying that "The Tonight Show" is a talk show. In addition, the video content directory module 120 may be executable by the STB processor 104 to provide a cross-reference indicator specifying that the video content has been sorted into a plurality of sub-directories.

In addition, the video content directory module 120 may be executable by the STB processor 104 to send video content directory information to the video content organizing server 142. For example, the video content directory module 120 may be executable by the STB processor 104 to send a unique identifier associated with a particular video content selection to the video content organizing server 142 to enable access to data associated with the particular video content selection. The video content directory module 120 may be executable by the STB processor 104 to send the unique identifier to the video content organizing server 142 in response to storing the particular video content selection at the data storage device 160.

Further, the video content directory module 120 may be executable by the STB processor 104 to send video content directory information to the video content organizing server 142 to provide information to generate a main directory, a plurality of sub-directories, or any combination thereof, for video content stored at the data storage device 160. For example, the video content directory information may include data associated with each video content selection included in a particular directory, such as video content first title data, video content second title data, a video content category indicator, video content summary data, a time that the video content selection was broadcast, a time that the video content selection was recorded, or any combination thereof. In addition, the video content directory module 120 may be executable by the STB processor 104 to send video content title amendment data to the video content organizing server 140 indicating that the first title of a particular video content selection has been changed to a second title.

In a particular embodiment, the memory 106 may include a search module 122 that is executable by the STB processor 104 to identify video content matching specified search criteria. For example, the search module 122 may be executable by the STB processor 104 to search data associated with video content stored at the data storage device 160, such as the first title, the second title, or both, for at least one keyword. The search module 122 may be executable by the STB processor 104 to receive a plurality of inputs from an input device indicating the keywords for a particular search.

Figure 4:
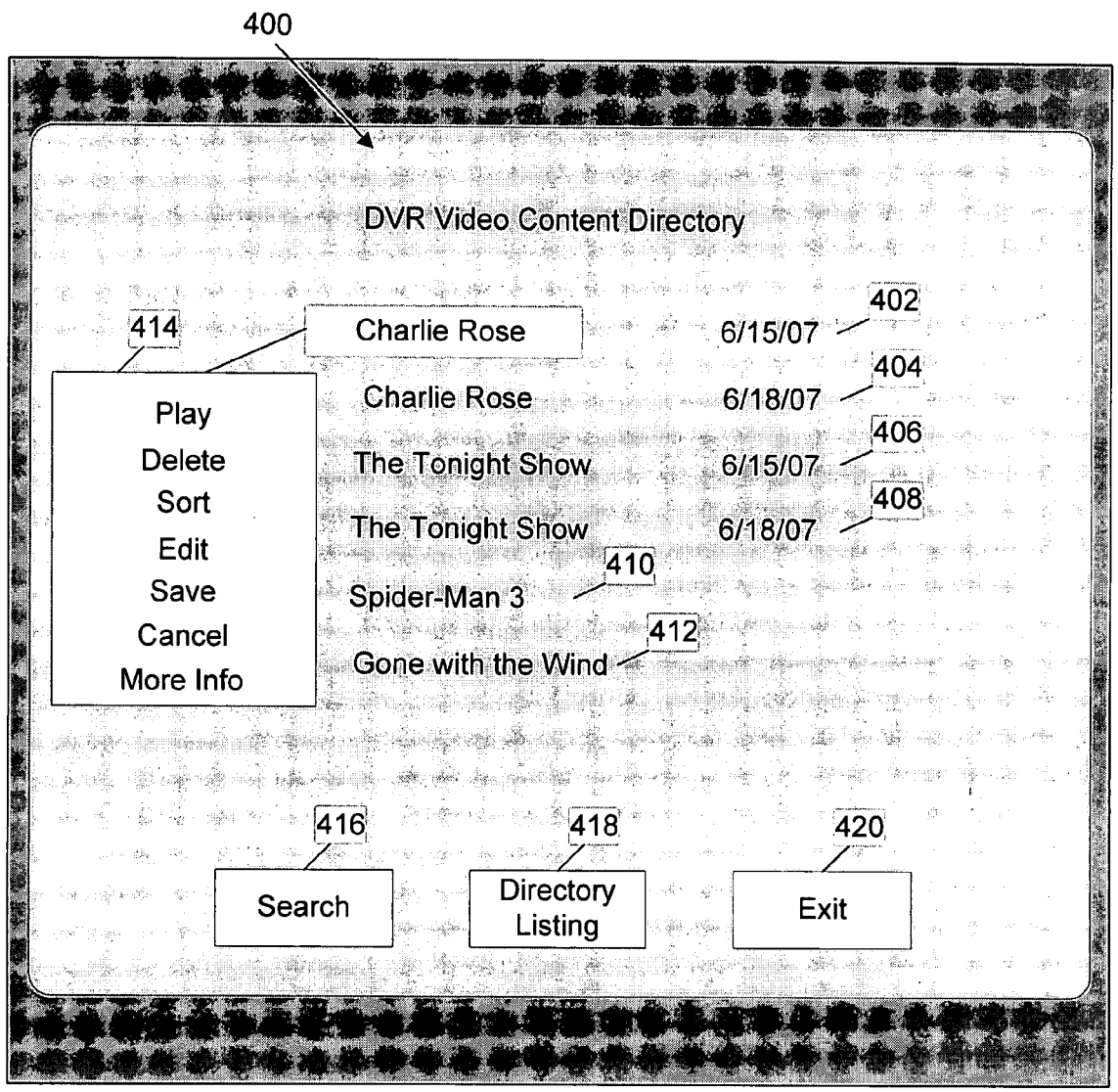
FIG. 4 is a diagram of a particular embodiment of a graphical user interface to organize video content.
Figure 5:
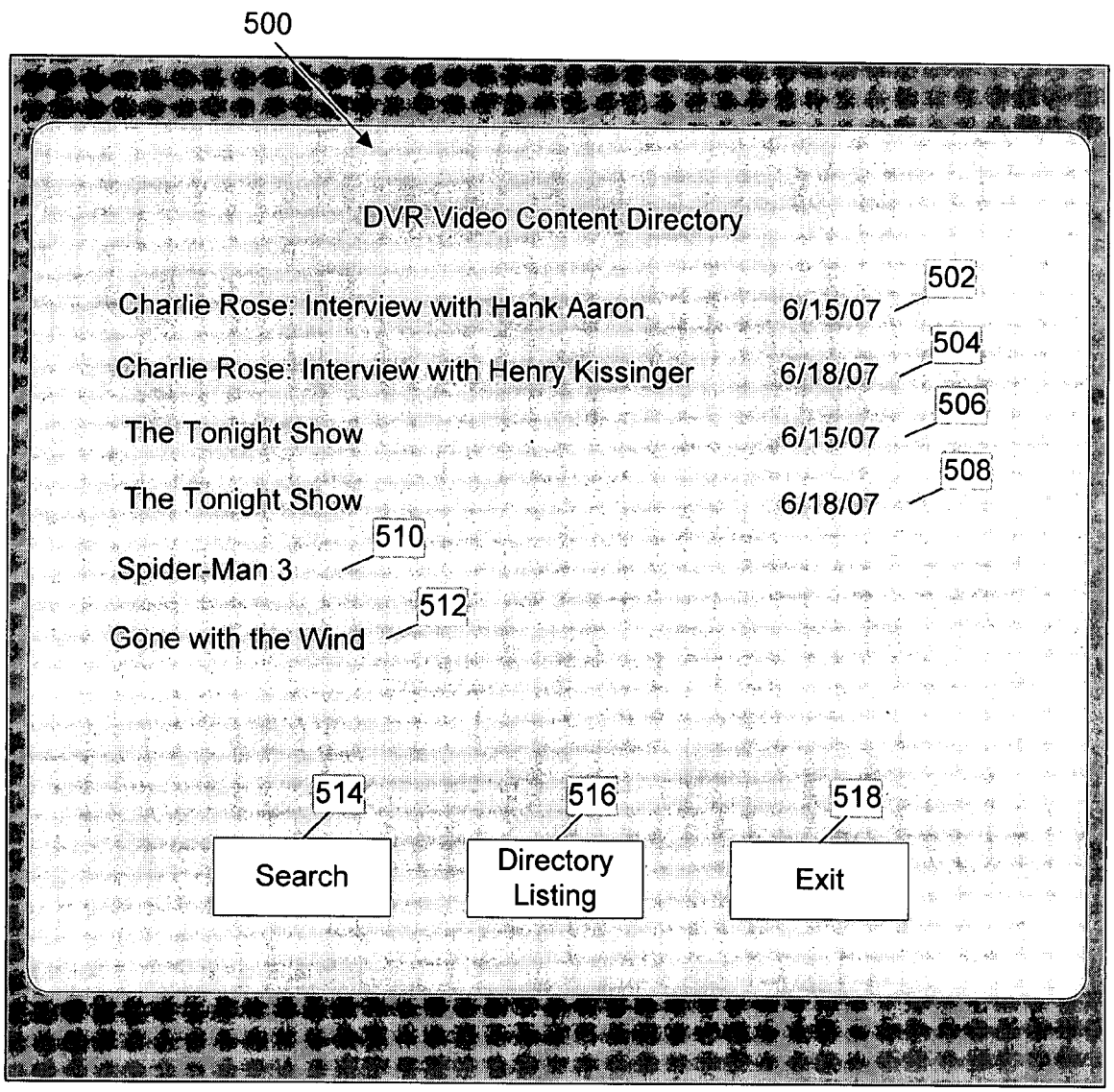
FIG. 5 is a diagram of a second particular embodiment of a graphical user interface to organize video content.

In a particular embodiment, the memory 106 may include a graphical user interface module 124 that is executable by the STB processor 104 to provide a graphical user interface (GUI) including a main directory, a plurality of sub-directories, or any combination thereof, of video content stored at the data storage device 160. An example of a video content main directory GUI is illustrated in FIG. 4 and an example of a video content sub-directory GUI is illustrated in FIG. 5. The GUI module 124 may be executable by the STB processor 104 to provide a GUI that includes information related to the particular video content selections included in a respective directory associated with the GUI. The GUI information may include the first title of the video content selections, the second title of the video content selections, a time that the video content selections were broadcast, a time that the video content selections were stored at the data storage device 160, video content summary data, or any combination thereof. The GUI module 124 may also be executable by the STB processor 104 to provide a GUI that includes an option to change a title of video content, an option to search stored video content data, an option to sort video content into a particular directory, or any combination thereof. The GUI module 124 may be executable by the STB processor 104 to provide data corresponding to a GUI to the display device 112.

In a particular embodiment, the memory 106 may include a Web interface module 126 that is executable by the STB processor 104 to facilitate communication between the set-top box device 102 and the remote device 138 via the Internet. In an illustrative embodiment, the Web interface module 126 may be executable by the STB processor 104 to provide a Web portal accessible to the remote device 138. In an illustrative, non-limiting embodiment, the Web interface module 126 may be executable by the STB processor 104 to provide access to the Web portal after receiving an identification associated with a subscriber of the set-top box device 102, a password of a subscriber associated with the set-top box device 102, or any combination thereof. The Web portal may provide access to data associated with video content stored at the data storage device 160. For example, the Web portal may provide access to at least one graphical user interface that includes a main directory, a plurality of sub-directories, or any combination thereof, associated with video content stored at the data storage device 160. In addition, the Web portal may provide an option to change the title of a particular video content selection.

The video content organizing server 142 can include processing logic 144 and memory 146 that is accessible to the processing logic 144. In a particular embodiment, the memory 146 includes a video content directory module 148 that is executable by the processing logic 146 to receive video content directory information from a set-top box device, such as the set-top box device 102. The video content directory information may include data related to video content stored at the data storage device 160. In an illustrative, non-limiting embodiment, the video content directory information may include video content title data; video content summary data, such as plot, actors, rating, or release date; a time that the video content selection was broadcast; a time that the video content selection was recorded; a video content category indicator; or any combination thereof. In addition, the video content organizing server 142 may, via the processing logic 144, receive video content directory information from a video content provider server, such as the video server 140. The video content directory module 148 may be executable by the processing logic 144 to store the received video content directory information at the data storage device 162.

The video content directory module 148 may be executable by the processing logic 144 to assign video content to a main directory, at least one sub-directory, or any combination thereof. The video content directory module 148 may be executable by the processing logic 144 to assign video content based on a title of the video content, a video content category indicator of the video content, a time that the video content was broadcast, a time that the video content was recorded, summary information associated with the video content, or any combination thereof.

The video content directory module 148 may also be executable by the processing logic 144 to receive updated video content directory information from the set-top box device 102. For example, the updated video content directory information may include video content title amendment data indicating that the title associated with a particular video content selection stored at the data storage device 160 has been changed from a first title to a second title. The video content directory module 148 may be executable by the processing logic 144 to assign the particular video content selection to a main directory, at least one sub-directory, or any combination thereof, based on the updated video content directory information. To illustrate, the video content directory module 148 may be executable by the processing logic 144 to assign the particular video content selection to a directory based on the first title, the second title, or any combination thereof. Further, the video content directory module 148 may be executable by the processing logic 144 to store the updated video content directory information at the data storage device 162. For example, the video content directory module 148 may be executable by the processing logic 144 to overwrite data stored at the data storage device 162 that is associated with a particular video content selection based on the updated video content directory information. In another example, the video content directory module 148 may be executable by the processing logic 144 to add to the data stored at the data storage device 162 that is associated with a particular video content selection based on the updated video content directory information.

In a particular embodiment, the video content directory module 148 may be executable by the processing logic 144 to receive at least one command from the remote device 138 to change video content directory information stored at the data storage device 162. For example, the video content directory module 148 may be executable by the processing logic 144 to change the title of a particular video content selection from a first title to a second title in response to receiving the at least one command from the remote device 138. After the video content directory information has been changed, the video content directory module 148 may be executable by the processing logic 144 to send data corresponding to the amended video content directory information to the set-top box device 102. For example, the video content directory module 148 may be executable by the processing logic 144 to send video content title amendment data to the set-top box device 102 indicating that the title of the particular video content selection has been changed from a first title to a second title. In addition, the video content directory module 148 may be executable by the processing logic 144 to assign a particular video content selection to a directory according to commands received from the remote device 138.

In a particular embodiment, the memory 146 may include a search module 150 that is executable by the processing logic 144 to identify video content matching specified search criteria. For example, the search module 150 may be executable by the processing logic 144 to search video content directory information stored at the data storage device 162, such as a first title of a video content selection, a second title of the video content selection, or any combination thereof, for at least one keyword. The search module 150 may be executable by the processing logic 144 to receive data indicating search keywords from the remote device 138.

In a particular embodiment, the memory 146 may include a graphical user interface (GUI) module 152 that is executable by the processing logic 144 to provide a GUI including a main directory, a plurality of sub-directories, or any combination thereof, using video content directory information stored at the data storage device 162. The GUI module 152 may be executable by the processing logic 144 to provide the GUI to the remote device 138.

In a particular embodiment, the memory 146 includes a Web interface module 154 that is executable by the processing logic 144 to provide remote access to video content directory information stored at the data storage device 162. In an illustrative embodiment, the Web interface module 154 may be accessible by the processing logic 144 to facilitate communication between the video content organizing server 142 and the remote device 138 via the Internet 136. For example, the Web interface module 154 may be executable by the processing logic 144 to provide a Web portal accessible to the remote device 138. In an illustrative, non-limiting embodiment, the Web interface module 154 may be executable by the processing logic 144 to provide access to the Web portal after receiving an identification of a subscriber associated with the set-top box device 102, an identification of a technician of a video content provider, an identification of a customer service representative of a video content provider, or any combination thereof. In addition, the Web interface module 154 may be executable by the processing logic 144 to provide access to the Web portal in response to receiving a password of a subscriber associated with the set-top box device 102, a password of a technician of a video content provider, a password of a customer service representative of a video content provider, or any combination thereof. The Web portal may provide access to video content directory information via at least one graphical user interface. The Web interface module 154 may also be executable by the processing logic 144 to provide a firewall that limits access to the video content organizing server 142 from the Internet 136.

For ease of explanation, the various modules 118-126 and 148-154 have been described in terms of processor-executable instructions. However, those skilled in the art will appreciate that such modules can be implemented as hardware logic, processor-executable instructions, or any combination thereof.

Figure 2:
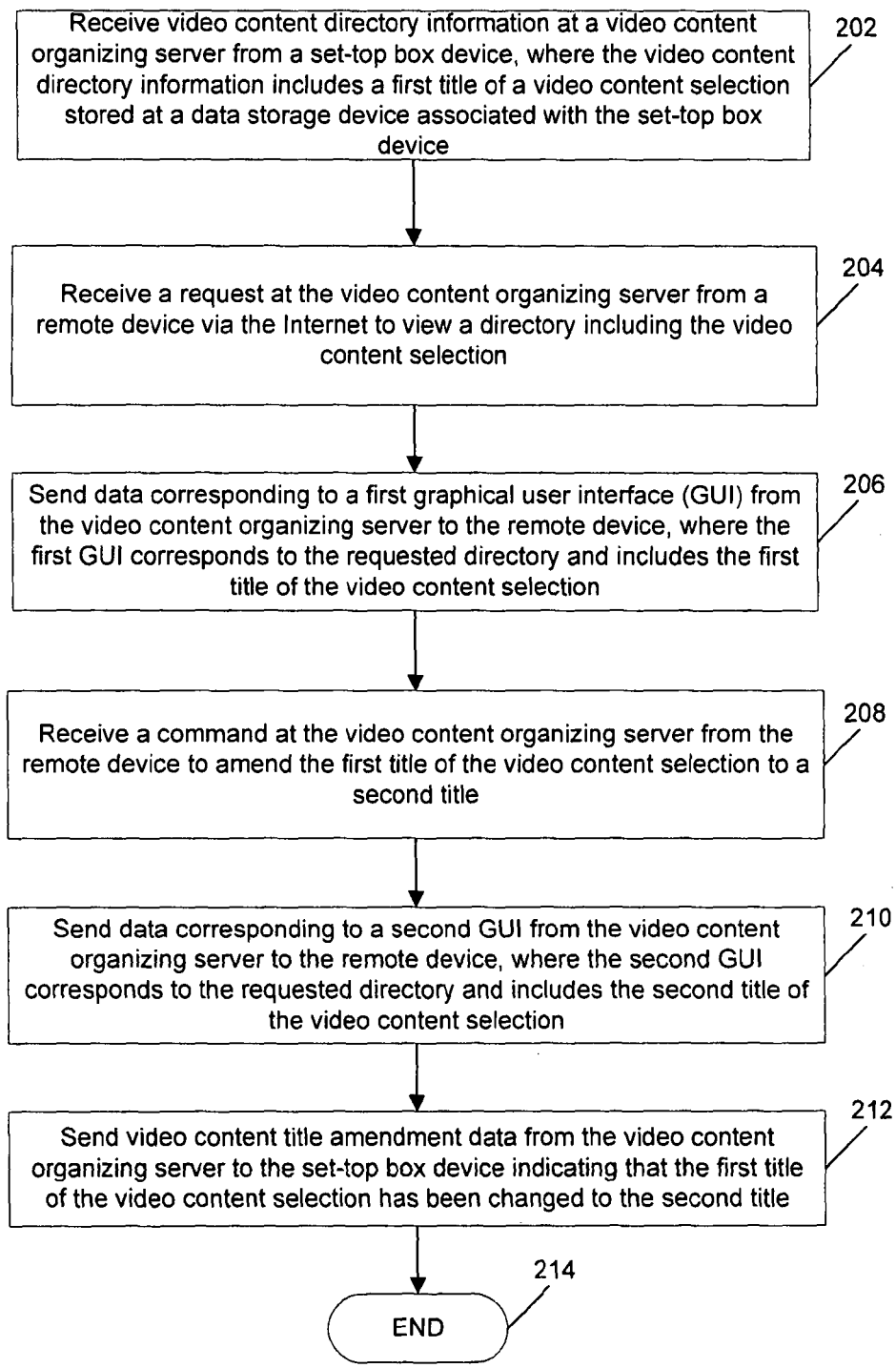
FIG. 2 is a flow diagram of a particular embodiment of a method of organizing video content.

FIG. 2 is a flow diagram of a particular embodiment of a method of organizing video content. At block 202, a video content organizing server receives video content directory information from a set-top box device. The video content directory information includes a first title of a video content selection stored at a data storage device associated with the set-top box device. Moving to block 204, the video content organizing server receives a request from a remote device via the Internet to view a directory including the video content selection. Proceeding to block 206, the video content organizing server sends data corresponding to a first graphical user interface (GUI) to the remote device. The first GUI corresponds to the requested directory and includes the first title of the video content selection.

At block 208, the video content organizing server receives a command from the remote device to amend the first title of the video content selection to a second title. For example, in response to receiving the command to amend the first title to the second title, the video content organizing server may be operable to overwrite data indicating the first title of the video content selection with data indicating the second title. In another example, in response to receiving the command to amend the first title to the second title, the video content organizing server may be operable to write data indicating the second title of the video content selection to memory locations associated with the video content selection. In this way, memory associated with the video content selection includes data indicating the first title of the video content selection and data indicating the second title of the video content selection.

Moving to block 210, the video content organizing server sends data corresponding to a second GUI to the remote device. The second GUI corresponds to the requested directory and includes the second title of the video content selection. Proceeding to block 212, the video content organizing server sends video content title amendment data to the set-top box device indicating that the first title of the video content selection has been changed to the second title. The method terminates at 214.

Figure 3:
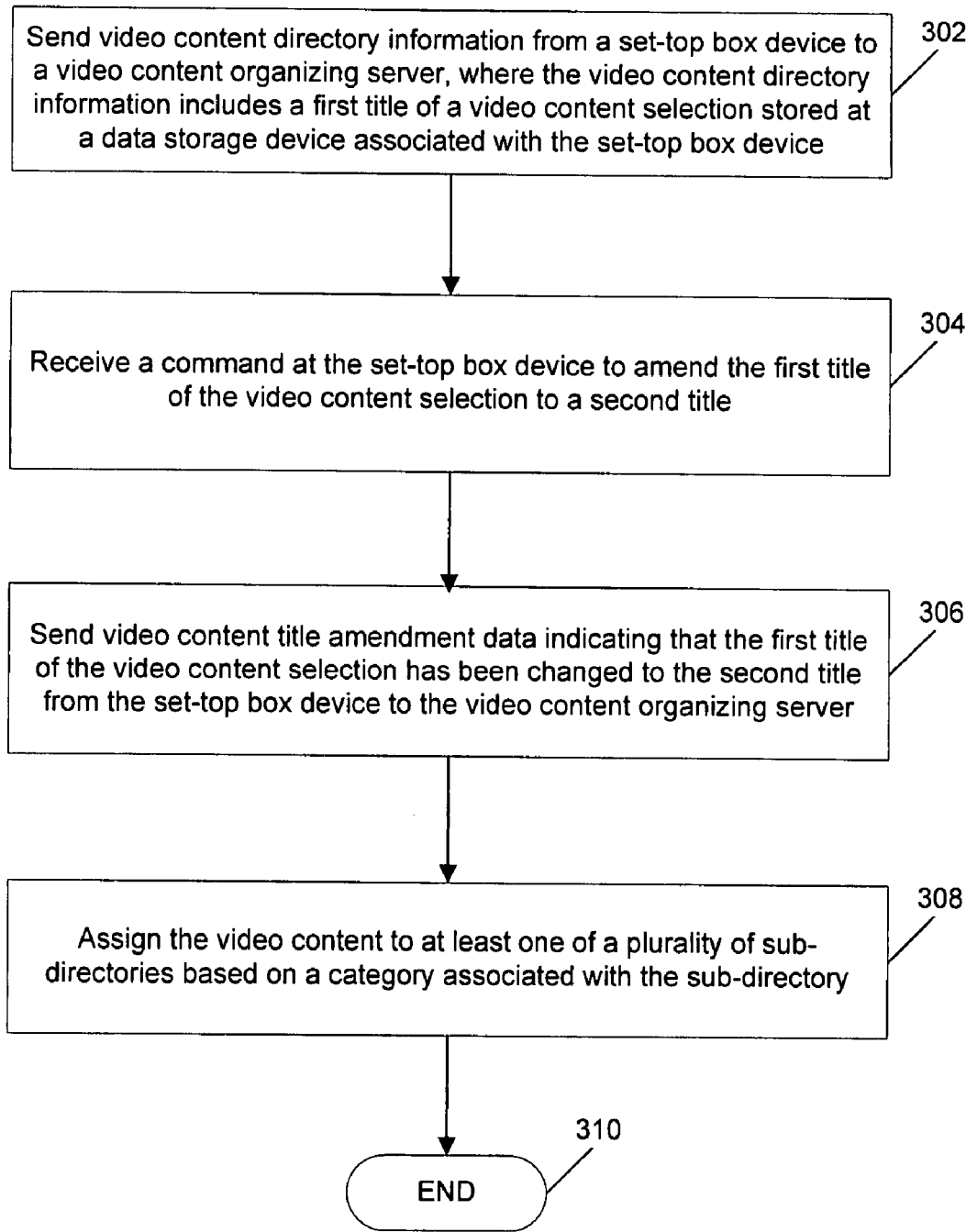
FIG. 3 is a flow diagram of a second particular embodiment of a method of organizing video content.

FIG. 3 is a flow diagram of a second particular embodiment of a method of organizing video content. At block 302, a set-top box device sends video content directory information to a video content organizing server. The video content directory information includes data indicating a first title of a video content selection, where the video content selection is stored at a data storage device that communicates with the set-top box device. Moving to block 304, the set-top box device receives a command to amend the first title of the video content selection to a second title. The second title may be a user-defined title provided by a subscriber associated with the set-top box device. The set-top box device may receive the command from an input device associated with the set-top box device, such as a remote control, or from a remote device, such as a mobile telephone or a laptop computer, via the Internet.

Proceeding to block 306, the set-top box device sends video content title amendment data to the video content organizing server indicating that the first title of the video content selection has been changed to the second title. At block 308, the video content is assigned to at least one of a plurality of sub-directories based on a category associated with the sub-directory. The video content selection may be automatically assigned to a main directory, at least one sub-directory, or any combination thereof, based on the first title of the video content selection, the second title of the video content selection, or any combination thereof. The set-top box device may assign the video content selection to a particular directory by associating a marker related to the video content selection, such as a unique identifier, with the respective directory. For example, memory locations related to the directory may include the unique identifier of each video content selection assigned to that respective directory.

FIG. 4 is a diagram of a particular embodiment of a graphical user interface (GUI) 400 to organize video content. The GUI 400 corresponds to a directory that includes information related to video content selections 402-412 stored at a data storage device associated with a particular set-top box device. The information related to the video content selections 402-408 includes the title of each respective video content selection and the date that the respective video content selection was broadcast. For example, the video content selections 402 and 404 relate to episodes of the "Charlie Rose" television show that were broadcast on Jun. 15, 2007, and Jun. 18, 2007, respectively. In addition, video content selection 406 relates to an episode of "The Tonight Show" that was broadcast on Jun. 15, 2007, and video content selection 408 relates to an episode of "The Tonight Show" that was broadcast on Jun. 18, 2007. The information related to the video content selections 410-412 includes the title of the respective video content selections. For example, the video content selection 410 relates to the movie "Spider-Man 3" and the video content selection 412 relates to the movie "Gone with the Wind."

The GUI 400 also includes a menu 414 that includes options associated with a particular video content selection. For example, the menu 414 may include options to play, delete, or sort the particular video content selection. The sort option may be selectable to present another graphical user interface that allows a subscriber associated with a set-top box device to move or copy the particular video content selection from one video content directory to another. In addition, the sort option may be selectable to automatically sort the particular video content selection according to specified criteria. To illustrate, the video content selection 402 may be assigned to a "sports" sub-directory based on subject matter included in the video content selection 402, such as an interview with Hank Aaron. The menu 414 also includes options to edit the title of the particular video content selection, save the edited title, and cancel a proposed edited title. Further, the menu 414 includes an option to view more information related to the particular video content selection, such as video content summary data (e.g. plot, actors, rating, release date), or a time that the video content was recorded.

The menu 414 may be displayed in response to an input or a sequence of inputs entered via an input device, such as a remote control, a keyboard, a mouse, a remote device, such as a mobile telephone or a laptop computer, another input device, or any combination thereof. In an illustrative embodiment, the GUI 400 shows that a video content selection 402 has been chosen by highlighting the title of the video content selection 402. After the video content selection 402 has been chosen, the GUI 400 may show the menu 414 in response to a right mouse click or in response to a command associated with a particular button on a remote control.

The GUI 400 also includes selectable icons 416-420. The icon 416 may be selectable to provide a search graphical user interface that allows a subscriber to perform keyword searches of data associated with the video content selections stored at a data storage device associated with a particular set-top box device. The icon 418 may be selectable to show a listing of all of the directories associated with the stored video content selections, such as a main directory, a plurality of sub-directories, or any combination thereof. In addition, the icon 420 may be selectable to exit the GUI 400 and return to another graphical user interface, such as a main menu.

FIG. 5 is a diagram of a second particular embodiment of a graphical user interface 500 to organize video content. The GUI 500 corresponds to a directory that includes information related to video content selections 502-512 stored at a data storage device associated with a particular set-top box device. The video content selections 502-512 correspond to the video content selections 402-412 included in the GUI 400 shown in FIG. 4. The GUI 500 indicates that the titles of video content selections 502 and 504 have been amended from their first titles to second titles. The second title of video content selection 502 indicates that the "Charlie Rose" episode that was broadcast on Jun. 15, 2007, included an interview with Hank Aaron. The second title of the video content selection 504 indicates that the "Charlie Rose" episode that was broadcast on Jun. 18, 2007, included an interview with Henry Kissinger.

The GUI 500 also includes selectable icons 514-518. The icon 514 may be selectable to provide a search graphical user interface that allows a subscriber to perform keyword searches of data associated with the video content selections stored at the data storage device associated with a particular set-top box device. The data searched may include both the first title of each video content selection and the second title of each video content selection. The icon 516 may be selectable to show a listing of all of the directories associated with the stored video content selections, such as a main directory, a plurality of sub-directories, or any combination thereof. In addition, the icon 518 may be selectable to exit the GUI 500 and return to another graphical user interface, such as a main menu.

Figure 6:
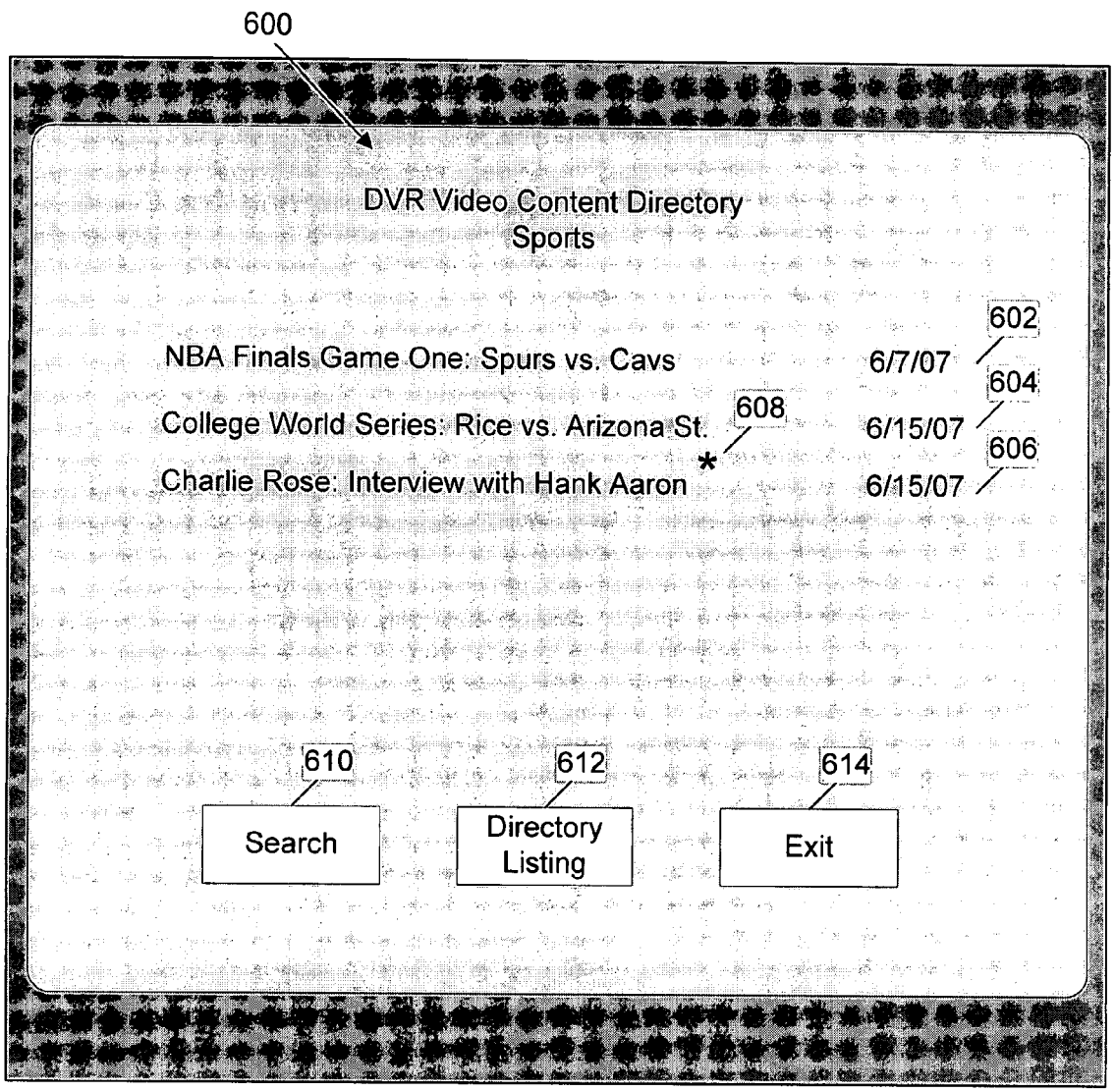
FIG. 6 is a diagram of a third particular embodiment of a graphical user interface to organize video content.

FIG. 6 is a diagram of a third particular embodiment of a graphical user interface (GUI) 600 to organize video content. The GUI 600 corresponds to a "sports" sub-directory that includes information related to the video content selections 602-606 that are stored at a data storage device associated with a particular set-top box device. The information related to the video content selections 602-606 includes the respective title of each video content selection and the date that the respective video content selection was broadcast. The title of each video content selection 602-606 corresponds to a second title of the respective video content selection. The second title is a user-defined title that provides more information about the subject matter associated with each particular video content selection 602-606 than the first title. For example, the first title of the video content selection 602 is "NBA Finals Game One," and the second title of the video content selection 602 indicates that the teams playing in the NBA Finals Game One are the Spurs and the Cavs. In another example, the first title of the video content selection 604 is "College World Series," and the second title of the video content selection 604 indicates that the recorded College World Series game was played between Rice and Arizona State. In a further example, the first title of the video content selection 606 is "Charlie Rose," and the second title of the video content selection 606 indicates that the Charlie Rose show that was broadcast on Jun. 15, 2007, included an interview with Hank Aaron.

The GUI 600 includes a cross-reference indicator 608. The cross-reference indicator 608 specifies that the video content selection 606 is included in another sub-directory, such as a "talk show" sub-directory. The cross-reference indicator 608 may be specific to the cross-referenced sub-directory. For example, an "*" may correspond to a "talk show" sub-directory, while a "▼" corresponds to a "reality show" sub-directory.

The GUI 600 also includes selectable icons 610-614. The icon 610 may be selectable to provide a search graphical user interface that allows a subscriber to perform keyword searches of data associated with the video content selections stored at the data storage device associated with the particular set-top box device. The data searched may include both the first title of each video content selection and the second title (i.e. the user-defined title) of the video content selection. The icon 612 may be selectable to show a listing of all of the directories associated with the stored video content selections, such as a main directory, one or more sub-directories, or any combination thereof. In addition, the icon 614 may be selectable to exit the GUI 600 and return to another graphical user interface, such as a main menu.

Figure 7:
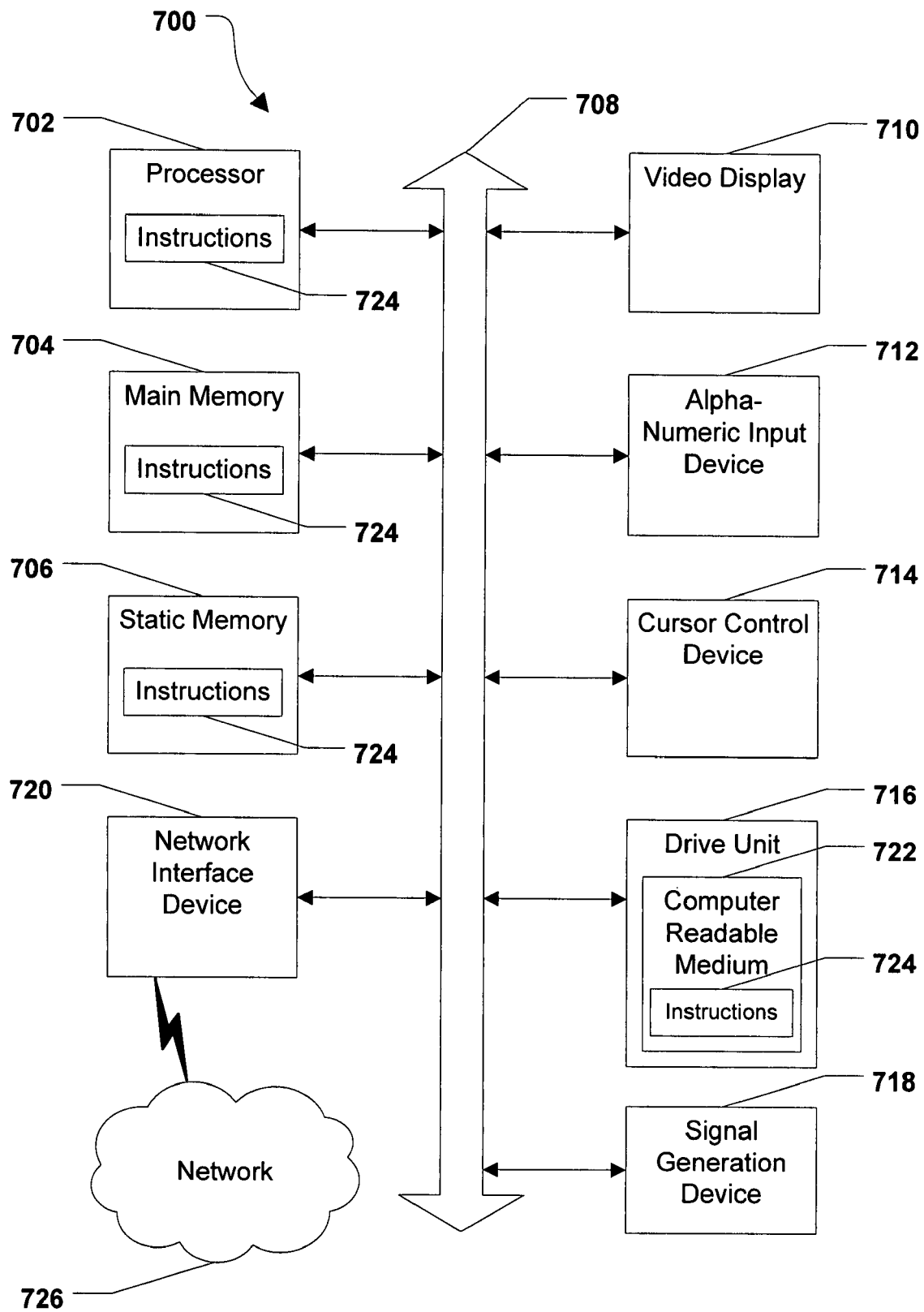
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices, including a video content organizing server, a video server, a remote device, an IPTV network switching device, or a set-top box device, as shown in FIG. 1.

In a networked deployment, the computer system may operate in the capacity of an IPTV server, such as a video server or application server, or a set-top box device. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video and/or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video and/or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof. In addition, associated security standards can also be applied to provide a more secure environment, such as Secure HyperText Transfer Protocol (SHTTP), Hypertext Transfer Protocol Secure (HTTPS), Secure Shell (SSH), or any combination thereof. By utilizing various security standards, the computing and network environment can be made more secure, that is highly available, confidential and data integrity can be protected.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of organizing video content, the method comprising:
    receiving video content title amendment data at a video content organizing server from a set-top box device, the video content title amendment data indicating that a first title of video content has been changed to a second title;
    receiving a request at the video content organizing server from a remote device to access data relating to the video content;
    sending video content second title data to the remote device in response to receiving the request, the video content second title data indicating the second title of the video content; and
    automatically assigning the video content to a directory based on the second title of the video content and based on a profile of a subscriber that is associated with the set-top box device.

2. The method of claim 1, wherein the directory is one of a main directory and a particular sub-directory of a plurality of sub-directories of the main directory.

3. The method of claim 1, wherein the first title of the video content is designated by a video content provider.

4. The method of claim 1, wherein the remote device is a mobile telephone, a laptop computer, a desktop computer, a hand-held computing device, or any combination thereof.

5. The method of claim 1, wherein the video content organizing server receives video content first title data indicating the first title of the video content.

6. The method of claim 5, wherein the video content organizing server receives the video content first title data from a video content provider server, the set-top box device, or any combination thereof.

7. A method of organizing video content, the method comprising:
    amending a first title of video content to a user-defined title in response to receiving a command to amend the first title of the video content to the user-defined title, wherein the video content is stored at a data storage device associated with a set-top box device; and
    automatically assigning the video content to at least one of a plurality of directories based on the user-defined title and based on a profile of a subscriber that is associated with the set-top box device, each of the plurality of directories associated with a respective category.

8. The method of claim 7, wherein data indicating the first title of the video content is overwritten with data indicating the user-defined title of the video content in response to receiving the command to amend the first title of the video content to the user-defined title.

9. The method of claim 7, wherein the set-top box device accesses data associated with the video content according to a unique identifier assigned to the video content.

10. The method of claim 9, wherein the data associated with the video content includes the first title of the video content and the user-defined title of the video content.

11. The method of claim 10, further comprising:
    receiving a request for video content directory information at the set-top box device, wherein the request is related to the at least one directory that includes the video content; and
    providing data indicating the first title of the video content, the user-defined title of the video content, or any combination thereof, in response to receiving the request.

12. The method of claim 7, wherein the set-top box device sends video content first title data to a video content organizing server, the video content first title data indicating the first title of the video content.

13. The method of claim 12, wherein the set-top box device sends video content title amendment data to the video content organizing server, the video content title amendment data indicating that the first title of the video content has been changed to the user-defined title.

14. A system to organize video content, the system comprising:
processing logic and memory accessible to the processing logic, the memory including:
a video content directory module executable by the processing logic to:
receive a command from a remote device to amend a first title of video content to a second title;
send video content title amendment data to a set-top box device, the video content title amendment data indicating that the first title of the video content has been changed to the second title; and
automatically assign the video content to a directory based on the second title of the video content and based on a profile of a subscriber that is associated with the set-top box device.

15. The system of claim 14, wherein the directory is one of a main directory and a particular sub-directory of a plurality of sub-directories of the main directory.

16. The system of claim 14, wherein the video content is assigned to a plurality of sub-directories and the video content directory module is executable by the processing logic to cross-reference the video content with respect to the plurality of sub-directories.

17. The system of claim 15, further comprising a data storage device that is operable to communicate with the processing logic.

18. The system of claim 17, wherein the video content directory module is executable by the processing logic to assign the video content to a particular directory by storing data associated with the video content in memory locations associated with the particular directory, wherein the memory locations are included in the data storage device.

19. The system of claim 18, wherein the video content directory module is executable by the processing logic to provide data from the memory locations associated with the particular directory in response to receiving a request for video content directory information related to the particular directory.

20. The system of claim 18, wherein the data associated with the video content includes video content first title data indicating the first title of the video content, video content second title data indicating the second title of the video content, or any combination thereof.

21. A set-top box device comprising:
a processor and memory accessible to the processor, the memory including:
instructions executable by the processor to send video content first title data to a video content organizing server, the video content first title data indicating a first title of a video content selection of a plurality of video content selections, wherein the plurality of video content selections are stored at a data storage device associated with the set-top box device;
instructions executable by the processor to receive a command to amend the first title of the video content selection to a second title;
instructions executable by the processor to send video content title amendment data to the video content organizing server, the video content title amendment data indicating that the first title of the video content selection has been changed to the second title; and
instructions executable by the processor to automatically assign the video content selection to a directory based on the second title and based on a profile of a subscriber that is associated with the set-top box device.

22. The set-top box device of claim 21, wherein the memory includes instructions executable by the processor to modify data associated with the first title of the video content selection in response to receiving the command to amend the first title of the video content selection to the second title, wherein the data associated with the first title of the video content selection is stored at the data storage device.

23. The set-top box device of claim 21, wherein the memory includes instructions executable by the processor to amend the first title of the video content selection to the second title in response to receiving data corresponding to an input entered via an input device.

24. The set-top box device of claim 21, wherein the memory includes instructions executable by the processor to search the first title of the video content selection, the second title of the video content selection, or any combination thereof, for at least one keyword.

25. The set-top box device of claim 21, wherein the memory includes instructions executable by the processor to receive a request to access data associated with the plurality of video content selections from a remote device via the Internet.

26. The set-top box device of claim 21, wherein the memory includes instructions executable by the processor to provide data corresponding to a graphical user interface (GUI) to a display device associated with the set-top box device, wherein the GUI includes the first title of the video content selection, the second title of the video content selection, or any combination thereof.

27. A non-transitory computer-readable medium having instructions, the instructions executable by a processor to:
receive video content title amendment data at a video content organizing server from a set-top box device, the video content title amendment data indicating that a first title of video content has been changed to a second title;
receive a request at the video content organizing server from a remote device to access data relating to the video content;
send video content second title data to the remote device in response to receiving the request, the video content second title data indicating the second title of the video content; and
automatically assign the video content to a directory based on the second title of the video content and based on a profile of a subscriber that is associated with the set-top box device.

28. The computer-readable medium of claim 27, wherein the video content organizing server receives the request from the remote device via a Web portal.

29. The computer-readable medium of claim 28, wherein the video content organizing server communicates with the remote device according to Secure Hypertext Transfer Protocol (SHTTP), Hypertext Transfer Protocol Secure (HTTPS), Secure Shell (SSH), or any combination thereof.

* * * * *